United States Patent
Zhang et al.

(10) Patent No.: US 10,494,514 B2
(45) Date of Patent: Dec. 3, 2019

(54) METHOD OF PREPARING BIO-BASED ELASTOMER COMPOSITION COMPRISING SILICA AND POLYDIBUTYL ITACONATE-TER-ISOPRENE-TER-GLYCIDYL METHACRYLATE

(71) Applicant: Beijing University of Chemical Technology, Beijing (CN)

(72) Inventors: Liqun Zhang, Beijing (CN); He Qiao, Beijing (CN); Runguo Wang, Beijing (CN); Wenji Xu, Beijing (CN); Weiwei Lei, Beijing (CN); Xinxin Zhou, Beijing (CN); Mingyuan Chao, Beijing (CN)

(73) Assignee: Beijing University of Technology, Beijing (CN)

( * ) Notice: Subject to any disclaimer, the term of this patent is extended or adjusted under 35 U.S.C. 154(b) by 92 days.

(21) Appl. No.: 15/761,054

(22) PCT Filed: Nov. 19, 2016

(86) PCT No.: PCT/CN2016/102900
§ 371 (c)(1),
(2) Date: Mar. 16, 2018

(87) PCT Pub. No.: WO2017/097043
PCT Pub. Date: Jun. 15, 2017

(65) Prior Publication Data
US 2018/0258264 A1    Sep. 13, 2018

(30) Foreign Application Priority Data
Dec. 10, 2015    (CN) .......................... 2015 1 0908543

(51) Int. Cl.
| | | |
|---|---|---|
| C08L 13/00 | (2006.01) |
| C08F 220/32 | (2006.01) |
| C08F 222/14 | (2006.01) |
| C08F 236/08 | (2006.01) |
| C08K 3/06 | (2006.01) |
| C08K 3/22 | (2006.01) |
| C08K 3/36 | (2006.01) |
| C08K 5/09 | (2006.01) |
| C08K 13/02 | (2006.01) |
| C08L 35/02 | (2006.01) |
| C08K 3/30 | (2006.01) |
| C08F 22/02 | (2006.01) |

(52) U.S. Cl.
CPC ............ *C08L 13/00* (2013.01); *C08F 220/32* (2013.01); *C08F 222/14* (2013.01); *C08F 236/08* (2013.01); *C08K 3/06* (2013.01); *C08K 3/22* (2013.01); *C08K 3/30* (2013.01); *C08K 3/36* (2013.01); *C08K 5/09* (2013.01); *C08K 13/02* (2013.01); *C08L 35/02* (2013.01); *C08F 22/02* (2013.01); *C08F 2800/20* (2013.01); *C08K 2003/309* (2013.01); *Y02T 10/862* (2013.01)

(58) Field of Classification Search
CPC ........ C08L 13/00; C08L 35/02; C08F 220/32; C08F 222/14; C08F 236/08; C08K 3/06; C08K 3/22; C08K 3/30; C08K 3/36; C08K 5/09; C08K 3/02
USPC ......................................................... 524/556
See application file for complete search history.

(56) References Cited

U.S. PATENT DOCUMENTS

2006/0229399 A1 * 10/2006 Panzer .................... C08L 23/04
                                                                524/425
2012/0282836 A1    11/2012 Korthals et al.

FOREIGN PATENT DOCUMENTS

| CN | 102558578 A | * | 7/2012 | |
|---|---|---|---|---|
| CN | 1665870 | | 11/2012 | |
| CN | 102558578 | | 11/2012 | |
| CN | 103224632 | | 11/2012 | |
| CN | 104725756 | | 11/2012 | |
| CN | 105622841 | | 11/2012 | |
| CN | 103224632 A | * | 7/2013 | |
| CN | 104725756 A | * | 6/2015 | |
| CN | 105622841 A | * | 6/2016 | ............... C08K 3/30 |
| EP | 1874864 | | 11/2012 | |
| JP | 03277602 | | 11/2012 | |
| WO | WO-2004005388 A1 | * | 1/2004 | ............. B82Y 30/00 |
| WO | WO2006113110 | | 10/2006 | |

* cited by examiner

*Primary Examiner* — Michael Bernshteyn
(74) *Attorney, Agent, or Firm* — Zhihua Han

(57) ABSTRACT

The present disclosure involves a preparation method of bio-based silica/poly (itaconate-ter-isoprene-ter-glycidyl methacrylate) nanocomposite. Bio-based silica/poly (itaconate-ter-isoprene-ter-glycidyl methacrylate) nanocomposite is environment-friendly, and silica and poly (itaconate-ter-isoprene-ter-glycidyl methacrylate) are derived from non-petroleum base materials, which do not rely on fossil fuel. Compared with nanocomposite without nanocomposite, nanocomposites with glycidyl methacrylate have better silica diffusion, mechanical properties and wet-skid resistance of rubber product are improved while consuming the same time. Further, rolling resistance is decreased so that using silane coupling agent is avoided. Therefore, the processing technology is simplified, and VOC emission is avoided. It is a kind of "green tire" rubber product.

2 Claims, 1 Drawing Sheet

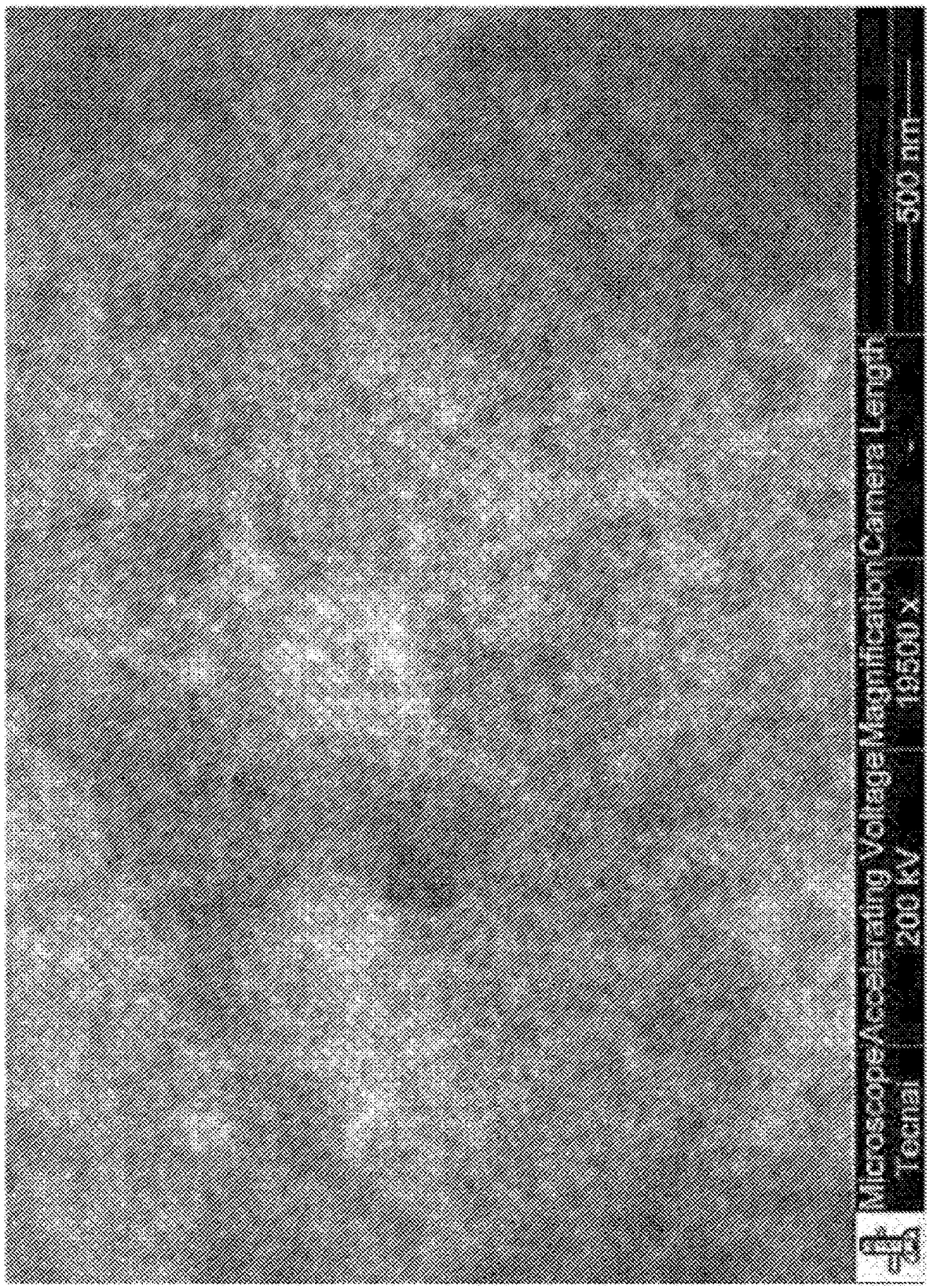

METHOD OF PREPARING BIO-BASED ELASTOMER COMPOSITION COMPRISING SILICA AND POLYDIBUTYL ITACONATE-TER-ISOPRENE-TER-GLYCIDYL METHACRYLATE

CROSS-REFERENCE TO RELATED APPLICATION

This application is a national stage application of International application number PCT/CN2016/102900, filed Nov. 19, 206, titled "Method of preparing bio-based elastomer composite comprising silica and poly dibutyl itaconate-ter-isoprene-ter-glycidyl methacrylate," which claims the priority benefit of Chinese Patent Application 201510908543.8, filed on Dec. 10, 2015, which is hereby incorporated by reference in its entirety.

TECHNICAL FIELD

The present disclosure relates to a bio-based elastomer nanocomposite, and its preparation method especially involves preparation for environment protecting rubber which improves the mechanical property and wet-skid resistance as well as lowers the rolling resistance. Moreover, this method can improve the dispersion of silica without using silane coupling agents and no VOC emission during the preparation process.

BACKGROUND

Rubber as one of the basic industry occupies a pivotal position in the national economy. Traditional rubber can be divided into natural rubber and synthetic rubber. For now, natural rubber is facing the problem of small planting area and harsh growth conditions; and synthetic rubber most comes from petrochemical resources. However, petrochemical resources lack and are polluted. Therefore, preparing a new kind of rubber that satisfies the performance of traditional rubber and solves the problem traditional rubber-faced is an important development direction of rubber area. Bio-based Engineering Elastomer is disclosed by Zhang Liqun research group, Beijing University of Chemical Technology under this background. The raw material of bio-based engineering elastomer does not rely on petrochemical resources, it can be synthesized by using traditional rubber processing technologies, and the product has better environmental stability.

Due to its molecular structure, rubber has high elasticity but bad mechanical strength. Normally, the filler is needed to improve its mechanical strength to make full use of value. The most used fillers in rubber area are carbon black and silica. In this instance, production of silica does not rely on mechanical strength, compared with carbon black, and rubber filled by silica has better wet-skid resistance and lower rolling resistance. But silica has a lot of "—OH" on its surface, filler flocculation easily occurs, and bad dispersion effect influences the performance of rubber product filled by silica. Currently, silane coupling agent is used in rubber industry to improve dispersion effect of silica and interfacial force between rubber and rubber through coupling silica and rubber. Rubber filled with silane coupling agent needs heating treatment; it not only increases the manufacturing cost but also makes the rubber processing technologies more complex. Moreover, VOC is generated during manufacture process of rubber nanocomposite, such as methanol and ethanol which are harmful to the environment.

Poly (itaconate-ter-isoprene-ter-glycidyl methacrylate) is a new kind of environment-friendly bio-based elastomer, and it takes itaconic acid, alcohol, and isoprene as raw materials. These raw materials can be prepared by biological fermentation. Poly (itaconate-ter-isoprene-ter-glycidyl methacrylate) contains a lot of ester groups and epoxy functional group; ester groups form a hydrogen bond with silica surface to improve the dispersion effect of silica. Ring-opening crosslinking is occurred between epoxy functional group and "—OH" on silica surface, and it improves the dispersion effect of silica in rubber elastomer and interfacial force between silica and rubber elastomer greatly and improves the mechanical property and wet-skid resistance as well as lower the rolling resistance of rubber product, while at the same time it simplifies manufacture process without using silane coupling agent. There are also no VOC emissions too. Therefore, silica/poly (itaconate-ter-isoprene-ter-glycidyl methacrylate) nanocomposite is a kind of promising "green tire" rubber material.

SUMMARY

The present disclosure discloses a preparation method of silica/poly (itaconate-ter-isoprene-ter-glycidyl methacrylate) nanocomposite. Glycidyl methacrylate is added to improve the dispersion of silica. It improves the mechanical property and wet-skid resistance as well as lower the rolling resistance of rubber product, it simplifies manufacture process and no VOC emissions.

The present disclosure discloses a preparation method of glycidyl methacrylate-functionalized bio-based elastomer/poly (itaconate-ter-isoprene-ter-glycidyl methacrylate), it is mixed with silica to prepare silica/poly (itaconate-ter-isoprene-ter-glycidyl methacrylate) nanocomposite. The manufacturing process can be finished without silane coupling agent.

The specific preparation conditions and procedures are as follows:

A: Preparation of bio-based poly (itaconate-ter-isoprene-ter-glycidyl methacrylate) elastomer.

Firstly, mix 30 to 90 wt. % itaconate, 10 to 70 wt. % isoprene and 0.5 to 20 wt. % glycidyl methacrylate (itaconate, isoprene, and glycidyl methacrylate are monomers, total wt. of the all three is 100%), add deionized water with 50-500% wt. of monomer as dispersant, add 0.5 to 10% emulsifier, 0 to 5% chelating agent, 0.01 to 5% reductant, 0.01 to 5% second reductant and 0.01 to 5% initiator, performing reaction for 6-72 hours under 5 to 30° C. to obtain poly (itaconate-ter-isoprene-ter-glycidyl methacrylate) emulsion, after demulsification and desiccation by flocculant, poly (itaconate-ter-isoprene-ter-glycidyl methacrylate) flocculent gel is obtained, poly (itaconate-ter-isoprene-ter-glycidyl methacrylate) flocculent gel is purified by soaking in ethanol and water successively, drying 24 hours in air-circulating oven at 60° C., poly (itaconate-ter-isoprene-ter-glycidyl methacrylate) bio-based elastomer is obtained.

The itaconate mentioned above comprises dimethyl itaconate, diethyl itaconate, dipropyl itaconate, diisopropyl itaconate, dibutyl itaconate, diisobutyl itaconate, dipentyl itaconate, diisoamyl itaconate, dihexyl itaconate, diheptyl phthalate itaconate and dioctyl phthalate itaconate but not limited to them.

The emulsifier mentioned above comprises at least one of potassium oleate, sodium oleate, disproportionated potassium rosin, disproportionated rosin sodium, sodium dodecyl sulfonate, sodium dodecyl benzene sulfonate, lauryl sodium sulfate, CO436 or a mix of them.

The reductant is EDTA-FeNa or ferrous sulfate.

The second reductant is sodium formaldehyde sulfoxylate or polyvinyl polyamide.

The chelating agent comprises EDTA-2Na, EDTA-4Na, EDTA-Fe.Na.

The initiator is tert-butyl hydroperoxide dicumyl peroxide or PMHP.

The flocculant is calcium chloride water with a mass concentration of 1 to 10%, 1 to 10% sodium chloride water, 1 to 5% hydrochloric acid, 1 to 5% sulfuric acid, ethanol or methanol.

B: silica/poly (itaconate-ter-isoprene-ter-glycidyl methacrylate) nanocomposite.

Take 100 phr of poly (itaconate-ter-isoprene-ter-glycidyl methacrylate) bio-based elastomer to react with over 10 phr of silica, 0.5 to 3.0 phr of Sulphur, 0.5 to 3.0 phr of anti-ager, 0.5 to 10.0 phr of ZnO, 0.5 to 5 phr of stearic acid, 0.5 to 5 phr of accelerator, 0 to 30 phr of other fillers, they are mixed through open mill or internal mixer, then silica/poly (itaconate-ter-isoprene-ter-glycidyl methacrylate) nanocomposite is prepared through moldings curing at 130 to 170° C.

The silica is highly dispersed such as VN3, 833MP but not limited to these two.

The anti-ager comprises antioxidant 4010NA and antioxidant 4020 but not limited to these two.

The accelerator comprises accelerator M and accelerator CZ but not limited to these two.

The other fillers comprise paraffin and DAE but not limited to these two.

Beneficial Effects of the Present Disclosure

Compared with the composite without glycidyl methacrylate, silica/poly (itaconate-ter-isoprene-ter-glycidyl methacrylate) nanocomposite have following beneficial effects.

Dispersion and mechanical strength are improved obviously; rolling resistance of rubber is lower; wet-skid resistance is improved; the manufacturing process can be finished without silane coupling agent; manufacture process is simple; it is a kind of promising bio-based "green tire" rubber material.

DETAILED DESCRIPTION OF THE PREFERRED EMBODIMENTS

Embodiment 1

The experimental device is equipped with mechanical agitation, nitrogen access, thermometer, and condenser. At 5° C. and under nitrogen protection, 150 g deionized water, 5 g potassium oleate, 0.5 g ferrous sulfate, 0.1 g EDTA-4Na, 2 g sodium sulfoxylate formaldehyde, 60 g diethyl itaconate, 30 g isoprene, 10 g glycidyl methacrylate are added into the device with 400 r/min agitation. After 1 hour, add 0.1 g initiator cumyl hydroperoxide to initiate polymerization, rpm decreases to 200 r/min, react for 10 hours to get poly (diethyl itaconate-ter-isoprene-ter-glycidyl methacrylate) latex, the latex is poured into 2% wt NaCl to proceed demulsification flocculation, poly (diethyl itaconate-ter-isoprene-ter-glycidyl methacrylate) flocculent gel is obtained. The obtained flocculent gel is purified by soaking in ethanol and water successively and drying for 24 hours in an air-circulating oven at 60° C., and poly (diethyl itaconate-ter-isoprene-ter-glycidyl methacrylate) bio-based elastomer is obtained.

100 g poly (diethyl itaconate-ter-isoprene-ter-glycidyl methacrylate) bio-based elastomer, 50 g high dispersion silica 833MP, 1 g paraffin, 3 g zinc oxide, 1 g stearic acid, 2 g anti-ager 4010NA, 2 g accelerator CZ, 1 g accelerator M, 1.5 g sulfur are mixed homogeneously to produce rubber compound by using the double-roller open mill. Silica/poly (diethyl itaconate-ter-isoprene-ter-glycidyl methacrylate) bio-based elastomer nanocomposite is got by mold curing of rubber compound at 150° C.

Embodiment 2

The experimental device is equipped with mechanical agitation, nitrogen access, thermometer, and condenser. At 10° C. and under nitrogen protection, 300 g deionized water, 3.5 g disproportionated potassium rosinate, 1.5 g potassium oleate, 0.05 g ferrous sulfate, 0.1 g EDTA-4Na, 0.2 g sodium sulfoxylate formaldehyde, 78 g dipropyl itaconate, 20 g isoprene, 2 g glycidyl methacrylate are added into the device with 400 r/min agitation. After 1 hour, add 0.07 g initiator hydrogen peroxide p-menthane to initiate polymerization, rpm decreases to 200 r/min, react for 18 hours to get poly (dipropyl itaconate-ter-isoprene-ter-glycidyl methacrylate) latex, the latex is poured into 1% wt $CaCl_2$ to proceed demulsification flocculation, poly (dipropyl itaconate-ter-isoprene-ter-glycidyl methacrylate) flocculent gel is obtained. The obtained flocculent gel is purified by soaking in ethanol and water successively and drying for 24 hours in an air-circulating oven at 60° C., and poly (dipropyl itaconate-ter-isoprene-ter-glycidyl methacrylate) bio-based elastomer is obtained.

100 g poly (dipropyl itaconate-ter-isoprene-ter-glycidyl methacrylate) bio-based elastomer, 40 g high dispersion silica VN3, 1 g paraffin, 5 g zinc oxide, 1 g stearic acid, 1.5 g anti-ager 4020, 1 g accelerator M and 1 g accelerator CZ, 1.5 g sulfur are mixed homogeneously to produce rubber compound by using the double-roller open mill. Silica/poly (dipropyl itaconate-ter-isoprene-ter-glycidyl methacrylate) bio-based elastomer nanocomposite is got by mold curing of rubber compound at 150° C.

Embodiment 3

The experimental device is equipped with mechanical agitation, nitrogen access, thermometer, and condenser. At 20° C. and under nitrogen protection, 250 g deionized water, 2.5 g sodium dodecyl benzene sulfonate, 0.04 g EDTA-FeNa, 0.2 g sodium sulfoxylate formaldehyde, 65 g dibutyl itaconate, 30 g isoprene, 5 g glycidyl methacrylate are added into the device with 400 r/min agitation. After 1 hour, add 0.05 g initiator tertbutyl hydroperoxide to initiate polymerization, rpm decreases to 200 r/min, react for 12 hours to get poly (dibutyl itaconate-ter-isoprene-ter-glycidyl methacrylate) latex, the latex is poured into ethanol to proceed demulsification flocculation, poly (dibutyl itaconate-ter-isoprene-ter-glycidyl methacrylate) flocculent gel is obtained. The obtained flocculent gel is purified by soaking in ethanol and water successively and drying for 24 hours in an air-circulating oven at 60° C., and poly (dibutyl itaconate-ter-isoprene-ter-glycidyl methacrylate) bio-based elastomer is obtained.

100 g poly (dibutyl itaconate-ter-isoprene-ter-glycidyl methacrylate) bio-based elastomer, 50 g high dispersion silica VN3, 5 g zinc oxide, 0.5 g stearic acid, 1 g anti-ager 4010A, 1 g accelerator CZ and 0.7 g accelerator M, 1 g sulfur are mixed homogeneously to produce rubber compound by using the double-roller open mill. Silica/poly (dibutyl itaconate-ter-isoprene-ter-glycidyl methacrylate) bio-based elastomer nanocomposite is got by mold curing of rubber compound at 150° C.

Embodiment 4

The experimental device is equipped with mechanical agitation, nitrogen access, thermometer, and condenser. At 25° C. and under nitrogen protection, 400 g deionized water, 5 g sodium dodecyl benzene sulfonate, 0.05 g EDTA-FeNa, 0.2 g sodium sulfoxylate formaldehyde, 67 g diisoamyl itaconate, 30 g isoprene, 3 g glycidyl methacrylate are added into the device with 400 r/min agitation. After 1 hour, add 0.05 g initiator tertbutyl hydroperoxide to initiate polymerization, rpm decreases to 200 r/min, react for 24 hours to get poly (diisoamyl itaconate-ter-isoprene-ter-glycidyl methacrylate) latex, the latex is poured into methanol to proceed demulsification flocculation, poly (diisoamyl itaconate-ter-isoprene-ter-glycidyl methacrylate) flocculent gel is obtained. The obtained flocculent gel is purified by soaking in ethanol and water successively and drying for 24 hours in an air-circulating oven at 60° C., and poly (diisoamyl itaconate-ter-isoprene-ter-glycidyl methacrylate) bio-based elastomer is obtained.

100 g poly (diisoamyl itaconate-ter-isoprene-ter-glycidyl methacrylate) bio-based elastomer, 70 g high dispersion silica 833MP, 5 g zinc oxide, 1 g stearic acid, 2 g anti-ager 4020, 1 g accelerator CZ and 1 g accelerator M, 1 g sulfur are mixed homogeneously to produce rubber compound by using an internal mixer. Silica/poly (diisoamyl itaconate-ter-isoprene-ter-glycidyl methacrylate) bio-based elastomer nanocomposite is got by mold curing of rubber compound at 150° C.

Embodiment 5

The experimental device is equipped with mechanical agitation, nitrogen access, thermometer, and condenser. At 30° C. and under nitrogen protection, 300 g deionized water, 2 g sodium dodecyl benzene sulfonate, 2 g CO436, 0.1 g EDTA-FeNa, 0.5 g sodium sulfoxylate formaldehyde, 55 g dihexyl itaconate, 40 g isoprene, 5 g glycidyl methacrylate are added into the device with 400 r/min agitation. After 1 hour, add 0.1 g initiator cumyl hydroperoxide to initiate polymerization, rpm decreases to 200 r/min, react for 20 hours to get poly (dihexyl itaconate-ter-isoprene-ter-glycidyl methacrylate) latex, the latex is poured into 1% wt HCl to proceed demulsification flocculation, poly (dihexyl itaconate-ter-isoprene-ter-glycidyl methacrylate) flocculent gel is obtained. The obtained flocculent gel is purified by soaking in ethanol and water successively and drying for 24 hours in an air-circulating oven at 60° C., and poly (dihexyl itaconate-ter-isoprene-ter-glycidyl methacrylate) bio-based elastomer is obtained.

100 g poly (dihexyl itaconate-ter-isoprene-ter-glycidyl methacrylate) bio-based elastomer, 70 g high dispersion silica 833MP, 6 g zinc oxide, 1 g stearic acid, 0.5 g anti-ager 4010NA, 2 g accelerator CZ and 1 g accelerator M, 1.5 g sulfur are mixed homogeneously to produce rubber compound by using an internal mixer. Silica/poly (dihexyl itaconate-ter-isoprene-ter-glycidyl methacrylate) bio-based elastomer nanocomposite is got by mold curing of rubber compound at 150° C.

Comparison 1

The experimental device is equipped with mechanical agitation, nitrogen access, thermometer, and condenser. At 5° C. and under nitrogen protection, 150 g deionized water, 5 g potassium oleate, 0.5 g ferrous sulfate, 0.1 g EDTA-4Na, 2 g sodium sulfoxylate formaldehyde, 70 g diethyl itaconate, 30 g isoprene are added into the device with 400 r/min agitation. After 1 hour, add 0.1 g initiator cumyl hydroperoxide to initiate polymerization, rpm decreases to 200 r/min, react for 10 hours to get poly (diethyl itaconate-ter-isoprene) latex, the latex is poured into 2% wt NaCl to proceed demulsification flocculation, poly (diethyl itaconate-ter-isoprene) flocculent gel is obtained. The obtained flocculent gel is purified by soaking in ethanol and water successively and drying for 24 hours in an air-circulating oven at 60° C., and poly (diethyl itaconate-ter-isoprene) bio-based elastomer is obtained.

100 g poly (diethyl itaconate-ter-isopren) bio-based elastomer, 50 g high dispersion silica 833MP, 1 g paraffin, 3 g zinc oxide, 1 g stearic acid, 2 g anti-ager 4010NA, 2 g accelerator CZ, 1 g accelerator M, 1.5 g sulfur are mixed homogeneously to produce rubber compound by using the double-roller open mill. Silica/poly (diethyl itaconate-ter-isoprene) bio-based elastomer nanocomposite is got by mold curing of rubber compound at 150° C.

Comparison 2

The experimental device is equipped with mechanical agitation, nitrogen access, thermometer, and condenser. At 10° C. and under nitrogen protection, 300 g deionized water, 3.5 g disproportionated potassium rosinate, 1.5 g potassium oleate, 0.05 g ferrous sulfate, 0.1 g EDTA-4Na, 0.2 g sodium sulfoxylate formaldehyde, 80 g dipropyl itaconate, 20 g isoprene are added into the device with 400 r/min agitation. After 1 hour, add 0.07 g initiator hydrogen peroxide p-menthane to initiate polymerization, rpm decreases to 200 r/min, react for 18 hours to get poly (dipropyl itaconate-ter-isoprene) latex, the latex is poured into 1% wt $CaCl_2$ to proceed demulsification flocculation, poly (dipropyl itaconate-ter-isoprene) flocculent gel is obtained. The obtained flocculent gel is purified by soaking in ethanol and water successively and drying for 24 hours in an air-circulating oven at 60° C., and poly (dipropyl itaconate-ter-isoprene) bio-based elastomer is obtained.

100 g poly (dipropyl itaconate-ter-isoprene) bio-based elastomer, 40 g high dispersion silica VN3, 5 g zinc oxide, 1 g stearic acid, 1.5 g anti-ager 4020, 1 g accelerator CZ and 1 g accelerator M, 1.5 g sulfur are mixed homogeneously to produce rubber compound by using the double-roller open mill. Silica/poly (dipropyl itaconate-ter-isoprene) bio-based elastomer nanocomposite is got by mold curing of rubber compound at 150° C.

Comparison 3

The experimental device is equipped with mechanical agitation, nitrogen access, thermometer and condenser. At 20° C. and under nitrogen protection, 250 g deionized water, 2.5 g sodium dodecyl benzene sulfonate, 0.04 g EDTA-FeNa, 0.2 g sodium sulfoxylate formaldehyde, 70 g dibutyl itaconate, 30 g isoprene are added into the device with 400 r/min agitation. After 1 hour, add 0.05 g initiator tertbutyl hydroperoxide to initiate polymerization, rpm decreases to 200 r/min, react for 12 hours to get poly (dibutyl itaconate-ter-isoprene) latex, the latex is poured into ethanol to proceed demulsification flocculation, poly (dibutyl itaconate-ter-isoprene)flocculent gel is obtained. The obtained flocculent gel is purified by soaking in ethanol and water successively and drying for 24 hours in an air-circulating oven at 60° C., and poly (dibutyl itaconate-ter-isoprene) bio-based elastomer is obtained.

100 g poly (dibutyl itaconate-ter-isoprene) bio-based elastomer, 50 g high dispersion silica VN3, 5 g zinc oxide, 0.5 g stearic acid, 1 g anti-ager 4010A, 1 g accelerator CZ and 0.7 g accelerator M, 1 g sulfur are mixed homogeneously to produce rubber compound by using the double-roller open mill. Silica/poly (dibutyl itaconate-ter-isoprene) bio-based elastomer nanocomposite is got by mold curing of rubber compound at 150° C.

Comparison 4

The experimental device is equipped with mechanical agitation, nitrogen access, thermometer, and condenser. At 25° C. and under nitrogen protection, 400 g deionized water, 5 g sodium dodecyl benzene sulfonate, 0.05 g EDTA-FeNa, 0.2 g sodium sulfoxylate formaldehyde, 70 g diisoamyl itaconate, 30 g isoprene are added into the device with 400 r/min agitation. After 1 hour, add 0.05 g initiator tertbutyl hydroperoxide to initiate polymerization, rpm decreases to 200 r/min, react for 24 hours to get poly (diisoamyl itaconate-ter-isoprene) latex, the latex is poured into methanol to proceed demulsification flocculation, poly (diisoamyl itaconate-ter-isoprene) flocculent gel is obtained. The obtained flocculent gel is purified by soaking in ethanol and water successively and drying for 24 hours in an air-circulating oven at 60° C., and poly (diisoamyl itaconate-ter-isoprene) bio-based elastomer is obtained.

100 g poly (diisoamyl itaconate-ter-isoprene) bio-based elastomer, 70 g high dispersion silica 833MP, 5 g zinc oxide, 1 g stearic acid, 2 g anti-ager 4020, 1 g accelerator CZ and 1 g accelerator M, 1 g sulfur are mixed homogeneously to produce rubber compound by using an internal mixer. Silica/poly (diisoamyl itaconate-ter-isoprene) bio-based elastomer nanocomposite is got by mold curing of rubber compound at 150° C.

Comparison 5

The experimental device is equipped with mechanical agitation, nitrogen access, thermometer, and condenser. At 30° C. and under nitrogen protection, 300 g deionized water, 2 g sodium dodecyl benzene sulfonate, 2 g CO436, 0.1 g EDTA-FeNa, 0.5 g sodium sulfoxylate formaldehyde, 60 g dihexyl itaconate, 40 g isoprene are added into the device with 400 r/min agitation. After 1 hour, add 0.1 g initiator cumyl hydroperoxide to initiate polymerization, rpm decreases to 200 r/min, react for 20 hours to get poly (dihexyl itaconate-ter-isoprene) latex, the latex is poured into 1% wt HCl to proceed demulsification flocculation, poly (dihexyl itaconate-ter-isoprene) flocculent gel is obtained. The obtained flocculent gel is purified by soaking in ethanol and water successively and drying for 24 hours in an air-circulating oven at 60° C., and poly (dihexyl itaconate-ter-isoprene) bio-based elastomer is obtained.

100 g poly (dihexyl itaconate-ter-isoprene) bio-based elastomer, 70 g high dispersion silica 833MP, 6 g zinc oxide, 1 g stearic acid, 0.5 g anti-ager 4010NA, 2 g accelerator CZ and 1 g accelerator M, 1.5 g sulfur are mixed homogeneously to produce rubber compound by using an internal mixer. Silica/poly (dihexyl itaconate-ter-isoprene) bio-based elastomer nanocomposite is got by mold curing of rubber compound at 150° C.

Comparison 6

The experimental device is equipped with mechanical agitation, nitrogen access, thermometer, and condenser. At 20° C. and under nitrogen protection, 250 g deionized water, 2.5 g sodium dodecyl benzene sulfonate, 0.04 g EDTA-FeNa, 0.2 g sodium sulfoxylate formaldehyde, 70 g dibutyl itaconate, 30 g isoprene are added into the device with 400 r/min agitation. After 1 hour, add 0.05 g initiator tertbutyl hydroperoxide to initiate polymerization, rpm decreases to 200 r/min, react for 12 hours to get poly (dibutyl itaconate-ter-isoprene) latex, the latex is poured into ethanol to proceed demulsification flocculation, poly (dibutyl itaconate-ter-isoprene) flocculent gel is obtained. The obtained flocculent gel is purified by soaking in ethanol and water successively and drying for 24 hours in an air-circulating oven at 60° C., and poly (dibutyl itaconate-ter-isoprene) bio-based elastomer is obtained.

100 g poly (dibutyl itaconate-ter-isoprene) bio-based elastomer, 50 g high dispersion silica VN3, 5 g silane coupling agent TESPT, 5 g zinc oxide, 0.5 g stearic acid, 1 g anti-ager 4010A, 1 g accelerator CZ and 0.7 g accelerator M, 1 g sulfur are mixed homogeneously to produce rubber compound by using an internal mixer. Silica/poly (dibutyl itaconate-ter-isoprene) bio-based elastomer nanocomposite is got by mold curing of rubber compound at 150° C.

Table 1 testing results of nanocomoposite produced by embodiments and comparisons (Date in Table 1 was tested by the national standard test method).

TABLE 1 testing results of nanocomposite produced by embodiments and comparisons (Data in Table 1 was tested by the national standard test method).

| | Tensile strength/MPa | Breaking elongation rate/% | 100% tensile stress at a given elongation/MPa | Tanδ at 0° C. | Tanδ at 60° C. |
|---|---|---|---|---|---|
| Embodiments 1 | 11.2 | 340 | 2.8 | 0.451 | 0.256 |
| Embodiments 2 | 10.9 | 332 | 3.1 | 0.667 | 0.114 |
| Embodiments 3 | 11.6 | 352 | 3.0 | 0.808 | 0.107 |
| Embodiments 4 | 12.3 | 305 | 3.6 | 0.861 | 0.094 |
| Embodiments 5 | 12.1 | 336 | 3.7 | 0.762 | 0.082 |
| Comparison 1 | 8.9 | 560 | 1.3 | 0.421 | 0.305 |
| Comparison 2 | 8.7 | 502 | 1.5 | 0.634 | 0.185 |
| Comparison 3 | 9.4 | 538 | 1.3 | 0.398 | 0.147 |
| Comparison 4 | 10.6 | 457 | 1.9 | 0.460 | 0.128 |
| Comparison 5 | 9.2 | 424 | 2.3 | 0.381 | 0.097 |
| Comparison 6 | 11.1 | 401 | 1.9 | 0.521 | 0.126 |

As is shown in table 1, silica/poly (itaconate-ter-isoprene-ter-glycidyl methacrylate) nanocomposite produced by the present disclosure has better mechanical properties. Compared with nanocomposites without adding glycidyl methacrylate, it has higher tensile strength and modulus. In rubber area, Tan δ at 0° C. reflects wet-skid resistance performance, and Tan δ at 60° C. reflects rolling resistance of the tire. By adding glycidyl methacrylate, the wet-skid resistance of nanocomposite is improved while at the same time its rolling resistance is lower. The manufacturing process of the present disclosure can be finished without silane coupling agent, manufacture process is simple and no VOC emission. Thus, it is a kind of promising "green tire" rubber material.

FIG. 1 is a transmission electron microscope photo showing a bio-based elastomer composition of silica or poly dibutyl itaconate-ter-isoprene-ter-glycidyl methacrylate.

What is claimed is:

1. A method of preparing bio-based elastomer composition of silica and polydiibutyl itaconate-ter-isoprene-ter-glycidyl methacrylate, the method comprising:
   A: preparing a bio-based elastomer comprising polyitaconate-ter-isoprene-ter-glycidyl methacrylate by performing:
      mixing 30 to 90 wt. % itaconate, 10 to 70 wt. % isoprene, and 0.5 to 20 wt. % glycidyl methacrylate, wherein the itaconate, isoprene and glycidyl methacrylate are monomers, and a total wt. of the itaconate, isoprene and glycidyl methacrylate is 100%,
      adding deionized water with 50-500% wt. of the monomers as a dispersant, adding 0.5 to 10% an emulsifier, 0 to 5% a chelating agent, 0.01 to 5% a first reductant, 0.01 to 5% a second reductant, and 0.01 to 5% an initiator, performing reaction for 6 to 72 hours under 5 to 30° C. to obtain an emulsion of the polyitaconate-ter-isoprene-ter-glycidyl methacrylate, after demulsification and desiccation by flocculant, obtaining a flocculent gel of the polyitaconate-ter-isoprene-ter-glycidyl methacrylate, placing the flocculent gel in ethanol and water to purify the flocculent gel, drying the flocculent gel for 24 hours in an air-circulating oven at 60° C. to obtain the bio-based elastomer comprising polyitaconate-ter-isoprene-ter-glycidyl methacrylate, wherein the emulsifier comprises at least one selected from the group consisting of potassium oleate, sodium oleate, disproportionated potassium rosin, disproportionated rosin sodium, sodium dodecyl sulfonate, sodium dodecyl benzene sulfonate, lauryl sodium sulfate, the first reductant is EDTA-FeNa or ferrous sulfate, the second reductant is sodium formaldehyde sulfoxylate or polyvinyl polyamide, the chelating agent comprises EDTA-2Na, EDTA-4Na, and EDTA-Fe Na, the initiator comprises tert-butyl hydroperoxide dicumyl peroxide or PMFIP, flocculant comprises calcium chloride water with mass concentration of 1 to 10%, 1 to 10% sodium chloride water, 1 to 5% hydrochloric acid, 1 to 5% sulfuric acid, ethanol, or methanol; and B: preparing the bio-based elastomer composition of silica and polydibutyl itaconate-ter-isoprene-ter-glycidyl methacrylate based on the bio-based elastomer comprising polyitaconate-ter-isoprene-ter-glycidyl methacrylate obtained by:

providing 100 mass parts of the bio-based elastomer comprising polyitaconate-ter-isoprene-ter-glycidyl methacrylate to react with over 10 parts of silica, 0.5 to 3.0 parts sulphur, 0.5 to 3.0 parts anti-ager, 0.5 to 10.0 parts ZnO, 0.5 to 5 parts stearic acid, 0.5 to 5 parts accelerator, and 0 to 30 parts fillers, which are mixed through an open mill or internal mixer to obtain the bio-based elastomer composition of silica or polydibutyl itaconate-ter-isoprene-ter-glycidyl methacrylate by molding at 130 to 170° C., the silica is dispersed, the anti-ager comprises an antioxidant, the accelerator comprises an accelerator, the fillers comprises a filler, optionally paraffin and DAE.

2. The method of claim 1, wherein the itaconate is selected from the group consisting of dimethyl itaconate, diethyl itaconate, dipropyl itaconate, diisopropyl itaconate, dibutyl itaconate, diisobutyl itaconate, dipentyl itaconate, diisoamyl itaconate, dihexyl itaconate, diheptyl phthalate itaconate and dioctyl phthalate itaconate.

* * * * *